Feb. 3, 1959 V. I. MASON 2,872,668
MOISTURE DETECTOR
Filed Oct. 3, 1955 3 Sheets-Sheet 1
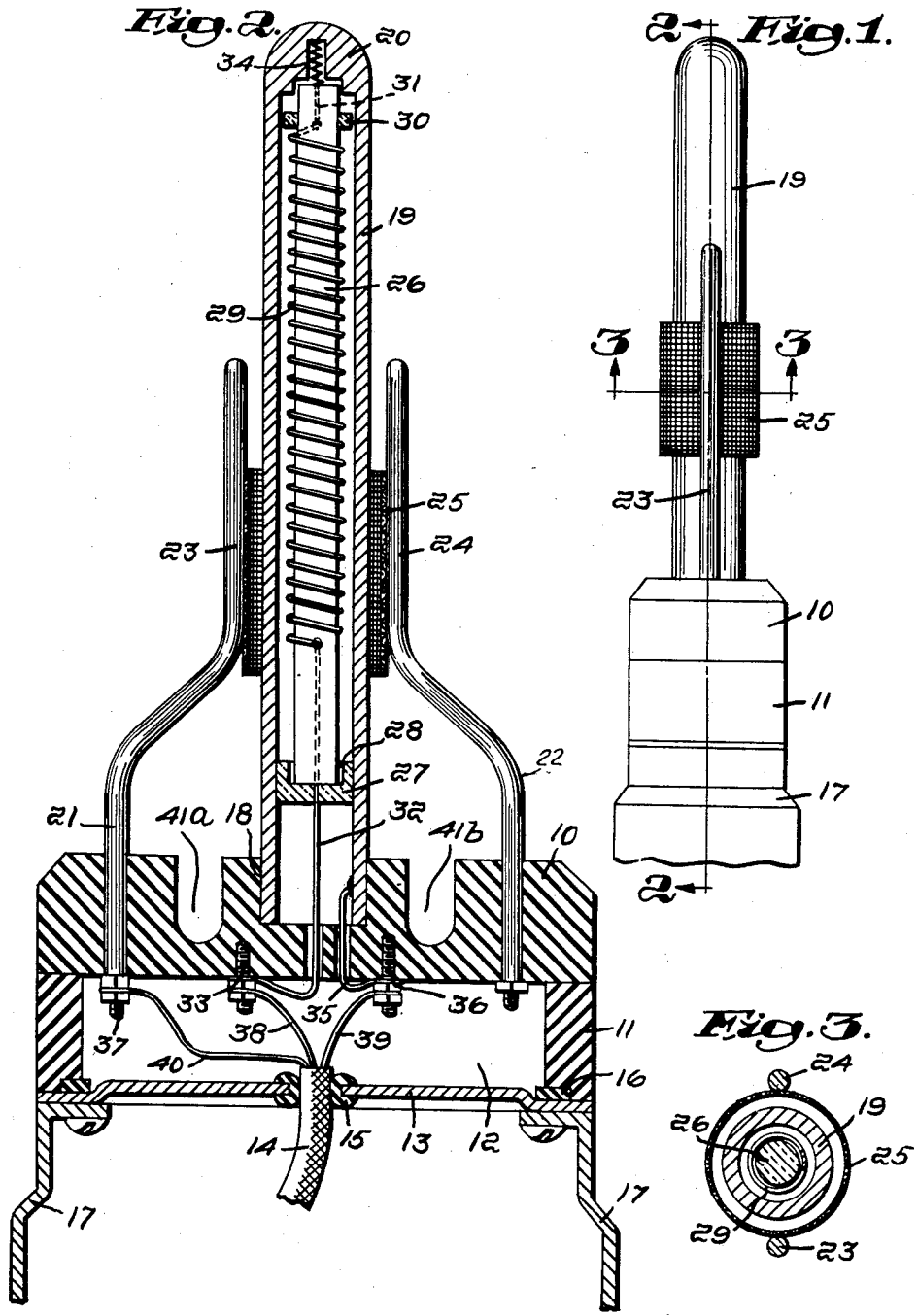
Inventor:
Vincent I. Mason,
by Arthur D. Thomson
Attorney

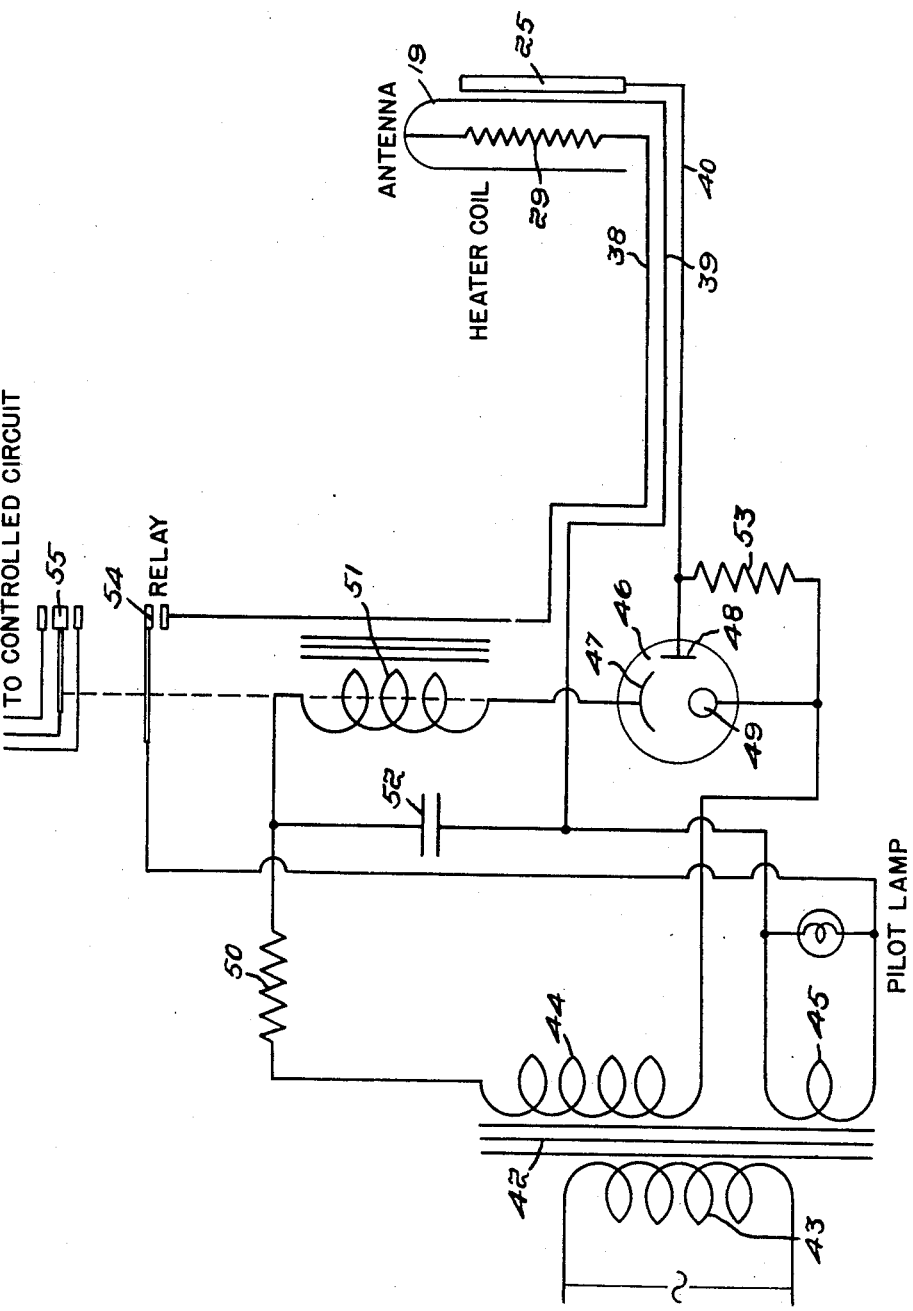

Feb. 3, 1959 V. I. MASON 2,872,668
MOISTURE DETECTOR
Filed Oct. 3, 1955 3 Sheets-Sheet 3
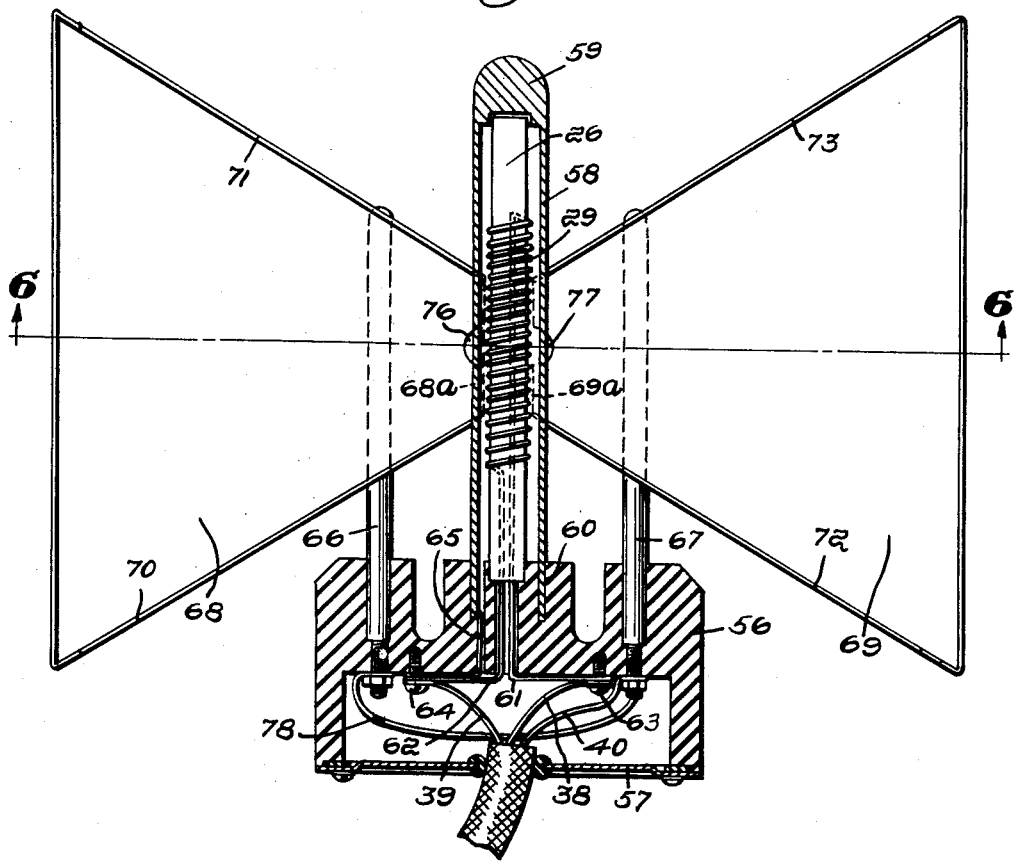
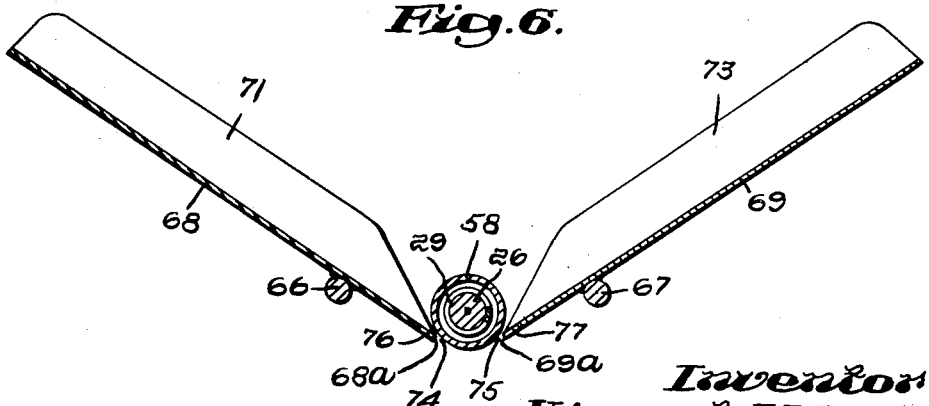
Inventor:
Vincent I Mason,
by Arthur D. Thomson
Attorney United States Patent Office 2,872,668
Patented Feb. 3, 1959

2,872,668

MOISTURE DETECTOR

Vincent I. Mason, Newton, Mass., assignor to Boston Manufacturing Company, Boston, Mass., a copartnership Application October 3, 1955, Serial No. 537,981

9 Claims. (Cl. 340—235)

This invention relates to moisture-sensitive elements adapted when exposed to excessive moisture, or upon contact with water, to operate some sort of control or indicating device. Moisture detector elements of this type are used, for example, to detect the presence of rain or snow, also as detector elements in liquid level control systems.

The device here disclosed is especially adapted to operate an automatic control system to shut the windows of a greenhouse, or similar building, when rain or snow occurs. The device may, however, be used as a probe for a liquid level control system or in general wherever it is desired to close or open an electrical circuit in response to the presence or absence of water or other conductive fluid.

The general object of this invention is to produce a moisture or liquid detector which is simple, reliable, and substantial enough to withstand outdoor exposure, which has no moving parts, and which is adaptable for use with various types of electric controls. Another object is to produce a rain detector which operates fairly quickly in response to the start or cessation of rain or snow fall, yet is not affected by momentary fluctuations in intensity of the fall, and the operation of which is not affected by wind. Further objects are to produce an electrical detecting element which can be adjusted to operate in response to a particular density of rainfall, and which is not materially affected by accumulation of dirt. Other objects and advantages of the device will be apparent from the description which follows.

In one form, the device consists in general of a tubular casing, closed at one end and mounted at the other end on an insulating base, and surrounded by a spaced tubular shell or screen. Electrical connections are made to the screen and the casing in such a manner that the presence of water or other conductive fluid between the screen and casing will close an electrical circuit. Inside the casing is a heater coil which is energized when the aforesaid circuit is closed. As long as rain continues to fall and collect between the screen and the casing the circuit path through the two will remain closed. When the rain stops, the heat generated by the heater coil will evaporate the moisture remaining between the screen and casing. In another form, the casing is arranged to lie horizontal and two sloping troughs are mounted on either side. The troughs have lower ends slightly spaced from the casing, and water running down the troughs bridges the gap to produce the electrical contact. In either form the device is preferably connected in the input circuit of an electronic relay.

In the drawings illustrating the invention:

Fig. 1 is a side elevation of a moisture detector constructed according to the invention;

Fig. 2 is an enlarged vertical cross-section of the detector, taken along line 2—2 of Fig. 1;

Fig. 3 is an enlarged cross-section along line 3—3 of Fig. 1;

Fig. 4 is a schematic diagram of a control circuit incorporating the detector;

Fig. 5 is a plan view, partly in cross-section, of a modified form of detector; and Fig. 6 is a cross-section taken along line 6—6 of Fig. 5.

In the form shown in Figs. 1–3, the detector elements are mounted on a base consisting of a cover block 10, and a base block 11, both made of an insulating material such as one of the thermosetting plastics ordinarily used for electrical equipment. Block 11 has a central cavity 12 which is closed by a bottom plate 13, forming a watertight enclosure, for the wiring connections. The cable 14, by which the device is connected, is brought in through an opening in the plate surrounded by a grommet 15. A gasket 16 is preferably employed between the plate and block 11, and the base may have attached brackets 17 for mounting the device.

Block 10 has a central recess 18 which receives the bottom of a tubular casing 19. The casing is preferably press-fitted in the recess and may also be cemented to form a water-tight joint. The casing has an integral, hemispherical top portion 20. A pair of rods 21 and 22 are mounted on block 10 to either side of the casing and are secured by means of nuts which engage threaded portions on their lower ends. These rods have upper, offset legs 23 and 24 which lie parallel, and fairly close to, the casing. The rods fit tightly enough in the block 10 to preclude the entry of water into cavity 12.

Mounted on legs 23 and 24 is a tubular shell or grid 25, which may be of sheet metal, but for outdoor use is preferably made of fine wire mesh, for example of a mesh about 60 to the inch. The casing 19, rods 21 and 22, and grid 25 are preferably made of a conductive non-corrosive metal such as stainless steel, but brass may be satisfactory for indoor use, for example when the device is used as a level control probe for a non-corrosive liquid. The grid is attached to the legs 23 and 24 by silver soldering or by other suitable means. For a rain detector, the grid is preferably spaced from the casing by about the diameter of an average raindrop, for example $\frac{1}{16}$ to $\frac{3}{32}$ of an inch.

Inside the casing 19 is mounted a ceramic tube 26 which is supported on an insulating disk 27, having a central recess 28, pressed into the casing. A heater coil 29, preferably made of a heat-resistant wire of material such as a nickel-chrome alloy, is wound around tube 26. A metal spacer ring 30 is loosely disposed around the upper end of tube 26 and is held up by the top turn of the heater coil. The upper end of the heater coil wire passes through a hole in the side of the tube and is formed into a lead 31 which passes out through the upper end of the tube. The lower end of the heater coil wire similarly passes through a hole in the side of tube 26 and forms a lead 32 which is brought out through the base of casing 19, and through block 10 to a wiring stud 33. Lead 31 is connected to a coil spring 34 which forms a resilient connection to the top portion 20 of the casing. A lead 35 is connected to the inside of the casing and brought out to another wiring stud 36. The lower end 37 of rod 21 serves as a third wiring stud.

The cable 14 consists of three wires 38, 39 and 40 which are connected to studs 33, 36 and 37, respectively. A pair of deep grooves 41a and 41b traverse the block 10 to either side of casing 19 between the casing and the rods 21 and 22. The grooves provide a long leakage path over the upper surface of the block between casing 19 and the rods, and minimize the possibility of a short circuit between the grid 25 and the casing resulting from formation of a film of moisture on the surface of the block.

Fig. 4 illustrates the manner of connecting the device in a typical control circuit. The detector as a whole is referred to in the diagram as an "antenna." The numeral 19 represents the casing, the numeral 25 the shell or grid, and the numeral 29 the heater coil. The control circuit is powered by a transformer 42 having a primary 43, which is connected to an ordinary source of A. C. supply, a high voltage secondary 44, and a low voltage secondary 45. The circuit comprises the following: a cold cathode tube 46, having the usual plate 47, control grid 48, and cathode 49; a plate circuit consisting of secondary 44, resistance 50, plate 47, and cathode 49, and including the energizing coil 51 of a relay; and a grid circuit consisting of secondary 44, resistance 50, condenser 52, and biasing resistor 53. The wire 39, leading to the casing 19 of the detector, is connected to one side of condenser 52 and to the upper end of secondary 45, and wire 40, leading to the shell or grid 25 of the detector, is connected to the grid 48 of tube 46, and to one side of resistor 53.

The relay coil 51 controls a pair of normally open low voltage contacts 54, one of which is connected to wire 38 which leads to the heater coil 29, and the other of which is connected to the lower end of secondary 45. The relay also controls a set of power contacts 55, here shown as a single pole double throw arrangement, the upper and middle contacts being normally closed and the lower and middle contacts being normally open. It is understood that these contacts may be wired in any conventional manner in the main circuit of an operating device, for example in the reversing circuit of a motor. The relay may operate any other conventional contact arrangement.

The operation of the device is as follows, assuming that it is desired to close the windows of a greenhouse when rain starts to fall, and to open the windows again when the rain stops. The detector device may be mounted remotely from the electronic relay, up to about 100 feet, and for this particular purpose would be mounted outside the greenhouse in a location exposed to rainfall. When rain starts, water rapidly collects between the grid 25 and casing 19. When enough water collects to bridge the gap between the two, current will flow through the input network, from secondary 44, through resistance 50, condenser 52, casing 19 to grid 25, resistance 53, and back to secondary 44. This current creates a voltage drop across resistor 53. A positive voltage with respect to cathode 49 is thus applied to grid 48 on alternate half cycles. The tube 46 is of the gas-filled cold cathode type which becomes conductive when a positive voltage is applied to its grid. Relay 51 therefore becomes energized, closing contacts 54, and also operating the power contacts 55, which would be arranged, for example, to start the motor of an automatic window closer.

The closing of contacts 54 energizes the heater coil 29, as long as rain continues to fall; any water which evaporates from the gap between casing 19 and grid 25 as the result of heating the casing will be continually replaced, so that electrical connection between the two will be maintained. When the rain stops, the heat from coil 29 will evaporate any moisture remaining between the casing and grid 25, thus breaking the connection and opening the grid circuit of the tube 48. The tube will be extinguished on the next half cycle when its plate becomes negative, and relay 51 will be deenergized, opening contacts 54 and allowing contacts 55 to return to their original condition. The latter may be arranged, in any well known manner, to reverse the motor of the window closer, so that the windows will be opened.

As previously stated, the grid 25 may be made of sheet metal rather than mesh. The latter, however, performs better when the detector is exposed to high winds, as water tends to be blown out readily from a smooth metal shell, whereas the mesh offers a better surface for adhesion. The time required to evaporate the moisture collected between the casing and the grid introduces a delay in operation of the device when the rainfall stops.

The device will not give a false indication if the rain is momentarily diverted, as for example by a gust of wind, or when the raifall is relatively light and scattered. The time delay can be varied by varying the proportions and wattage of the heater coil.

The ceramic tube 26 is protected against breakage by the sturdy metal casing 19, and is also resiliently mounted so that it can expand and contract freely with temperature changes. The whole device is simple and durable in construction and will withstand prolonged outdoor exposure, and yet remains sensitive and accurate. Even accumulations of dirt do not seriously affect its operaiton, as the grid offers a fairly large contact surface, and the establishment of a conductive path at any point between the casing and the grid will operate the device.

In the form shown in Figs. 5 and 6, the elements of the detector are mounted on an insulating base 56, which has a cavity 57 for accommodating wiring, and it is very similar to base 10 except that it is intended to be mounted sidewise. A tubular casing 58, having a closed end 59, is pressed into a circular groove 60 in the base. The ceramic element 26, on which the heater coil 29 is wound, is mounted in casing 58 with its ends received in appropriate recesses in the base and in closed end 59. This coil is connected by appropriate leads 61 and 62 to wiring lugs 63 and 64, respectively. The casing is also connected to lug 64 by a lead 65.

A pair of rigid rods 66 and 67 are mounted on base 56 and extend through into cavity 57 where they are secured by nuts. Mounted on these rods are a pair of metal troughs 68 and 69, of generally trapezoidal shape in plan, having upstanding side walls 70 and 71, and 72 and 73, respectively. These troughs have lower edges 68a and 69a disposed just below the tubular casing 58 and are spaced from the casing to form gaps 74 and 75. In the lower edges of the troughs are notches 76 and 77.

This form of the detector, when connected in the circuit of Fig. 4, functions in much the same manner as the form previously described. Wire 38 is connected to lug 63 which forms the contact for one end of the heater coil. Wire 39 is connected to lug 64 which forms to common contact for the casing and the other end of the heater coil. A bridging wire 78 connects the ends of rods 66 and 67 together, and wire 40 is connected to the end of rod 67.

Rain falling on troughs 68 and 69 runs down and collects between edges 68a and 69a, bridging gaps 74 and 75. Wires 39 and 40 are thus short-circuited, as long as rain is falling, and relay 51 is energized as previously explained. When the rain stops, the moisture is evaporated by the heat of the coil, which continues to be energized until the connection between troughs 68 and 69 and casing 58 is broken.

The form of detector shown in Figs. 5 and 6 can be made to operate in response to very light precipitation of moisture, as the moisture collects on the fairly large area of troughs 68 and 69 and is concentrated to flow into the comparatively restricted gaps 74 and 75. The size of the troughs, and the spacing of edges 68a and 69a from casing 58 can be varied to produce a response to the desired degree of precipitation. The purpose of notches 76 and 77, which may in some cases be omitted, is to provide for removal of excess water, for example, when a detector intended to respond to light precipitation is exposed to heavy rain. This form of detector may also be used to advantage in dusty or dirty locations, as the water flowing down the troughs tends to wash away any accumulations of dirt in the gaps.

I claim:

1. A liquid detector, of the type adapted to close an electrical circuit in response to presence of a conductive liquid, comprising an insulating base, a hollow casing of conductive material mounted on said base, said casing and said base forming a substantially continuous enclosure, a conductive support mounted on said base and spaced from said casing, a conductive member mounted on said support, said casing and said member defining a gap adapted to be bridged by the liquid, means on the base for making independent electrical connections to said casing and said support, and an electric heating element mounted in said enclosure and adapted, when energized, to heat the casing to speed evaporation of liquid from said gap.

2. A liquid detector as described in claim 1, said conductive support comprising a pair of rods disposed on either side of said casing, and said base having a pair of relatively deep grooves, one disposed between said casing and each of said rods, the grooves providing a long path over the surface of the base between the casing and said rods.

3. A liquid detector, of the type adapted to close an electrical circuit in response to presence of a conductive liquid, comprising an insulating base, a tubular casing of conductive material mounted on said base and projecting outward therefrom, said casing and said base forming an enclosure, a pair of conductive rods mounted on said base and projecting outward therefrom on opposite sides of the casing having inner portions spaced therefrom, said rods having offset outer legs disposed closer to the casing than said inner portions, a tubular shell mounted on said rods, surrounding the casing and generally concentric therewith, the casing and the shell defining a gap adapted to be bridged by the liquid, a heating coil mounted in said enclosure and having an outer end electrically connected to said casing, said coil being adapted, when energized, to heat the casing to speed evaporation of liquid from said gap, and means on said base for making independent electrical connections to said casing, to one of said rods, and to the inner end of said heater coil.

4. A liquid detector, of the type adapted to close an electric circuit in response to presence of a conductive liquid, comprising a tubular casing of conductive material, a pair of conductive troughs, one mounted on either side of said casing, each trough having a pair of walls converging toward said casing and an edge disposed substantially parallel to said casing and defining therewith a gap adapted to be bridged by the liquid, and an electric heating coil mounted in said casing and adapted, when energized, to heat the casing to speed evaporation of liquid from said gap.

5. A liquid detector as described in claim 4, having means for supporting said casing in generally horizontal position and said troughs in a position to slope downward toward the casing.

6. A liquid detector as described in claim 5, the troughs having notches in said edges adapted to permit escape of excess liquid.

7. A liquid detector of the type adapted to close an electrical circuit in response to presence of a conductive liquid, comprising an insulating base, a tubular casing of conductive material mounted on said base, said casing and said base forming an enclosure, a conductive support mounted on said base and spaced from said casing, a tubular conductive shell generally concentrically disposed around said casing and mounted on said support, said shell and said casing defining a gap adapted to be bridged by the liquid, means on said base for making independent electrical connections to said casing and said support, and an electric heating element mounted in said enclosure and adapted, when energized, to heat the casing to speed evaporation of liquid from said gap.

8. A liquid detector as described in claim 7, having an insulating disk fitting tightly in the casing, a ceramic tube mounted on said disk in spaced relationship to the casing, the casing having a closed end, a coil spring attached to said closed end, a spacer ring loosely surrounding said tube adjacent said closed end, the heating coil being wound on said tube and having an end extending inward and connected to said spring, said spring serving as an electrical connection between the coil and the casing as well as a resilient anchor for said ceramic tube.

9. A liquid detector as described in claim 7, said shell being composed of wire mesh and the width of said gap being approximately the diameter of a raindrop.

References Cited in the file of this patent

UNITED STATES PATENTS

| | | |
|---|---|---|
| 2,611,643 | Higgins | Sept. 23, 1952 |
| 2,647,234 | Pear | July 28, 1953 |
| 2,717,957 | Ohlheiser | Sept. 13, 1955 |